US007341337B2

(12) United States Patent
Ikeda

(10) Patent No.: US 7,341,337 B2
(45) Date of Patent: Mar. 11, 2008

(54) INK JET RECORDING APPARATUS AND INK JET HEAD

(75) Inventor: Takahisa Ikeda, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 220 days.

(21) Appl. No.: 10/880,901

(22) Filed: Jun. 30, 2004

(65) Prior Publication Data

US 2005/0007429 A1 Jan. 13, 2005

(30) Foreign Application Priority Data

Jul. 8, 2003 (JP) ............................. 2003-193320

(51) Int. Cl.
*C09D 11/00* (2006.01)

(52) U.S. Cl. ........................... 347/100; 347/93; 347/73

(58) Field of Classification Search .................. 347/93, 347/100, 73

See application file for complete search history.

(56) References Cited

U.S. PATENT DOCUMENTS

| | | | | |
|---|---|---|---|---|
| 5,724,082 | A | 3/1998 | Moynihan | |
| 5,846,307 | A * | 12/1998 | Nagasawa et al. | 106/31.75 |
| 6,152,559 | A * | 11/2000 | Kojima | 347/89 |
| 2001/0050017 | A1 | 12/2001 | Ohsawa et al. | |
| 2002/0024552 | A1* | 2/2002 | Suzuki et al. | 347/36 |
| 2004/0066437 | A1 | 4/2004 | Rutland et al. | |

FOREIGN PATENT DOCUMENTS

| | | | |
|---|---|---|---|
| EP | 1 219 443 | A1 | 7/2002 |
| JP | 2-1324 | A | 1/1990 |
| JP | 11-42771 | A | 2/1999 |

* cited by examiner

*Primary Examiner*—Manish S. Shah
*Assistant Examiner*—Laura E. Martin
(74) *Attorney, Agent, or Firm*—Frishauf, Holtz, Goodman & Chick, P.C.

(57) ABSTRACT

An ink jet recording apparatus in which a filter unit to filter ink with a filter having a pore size of 2.2 to 5.8 μm is provided in an ink supply channel to supply the ink to an ink jet head. The ink flowing through the ink supply channel is quickly filtered by the filter unit, and supplied to the ink jet head without delay, thus the occurrence of ink discharge failure can be reliably suppressed.

8 Claims, 6 Drawing Sheets

INK JET RECORDING APPARATUS AND INK JET HEAD

CROSS REFERENCE OF THE RELATED APPLICATION

This application is based upon and claims the benefit of priority from the prior Japanese Application No. 2003-193320, filed on Jul. 8, 2003, the entire contents of which are incorporated herein by reference.

BACKGROUND OF THE INVENTION

1. Field of the Invention

The present invention relates to an ink jet recording apparatus and an ink jet head.

2. Discussion of the Background

Conventionally, an ink jet recording apparatus such as an ink jet printer discharges ink from nozzles as ink droplets by pressurizing ink in an pressure chamber, attaches the ink droplets to a recording medium thereby forms an image.

In this apparatus, ink discharge failure may occur due to clogging in the nozzles or occurrence of bubbles in the pressure chamber. The ink discharge failure causes poor printing on a recording medium.

To solve this problem, a method of providing a filter in an ink supply channel communicating with the pressure chamber has been proposed (See Japanese Published Unexamined Patent Application No. Hei 2-1324). In this method, a filter where a pore size is 0.5 μm or smaller is employed. By using this filter, foreign materials which cause clogging in the nozzles or small particles as cores of bubbles occur in the pressure chamber can be removed, thus the occurrence of discharge failure of water-based ink can be prevented.

However, in a case where pigment ink having an particle diameter of average 100 to 400 nm is used in the ink jet recording apparatus, the filter having the pore size of 0.5 μm or smaller becomes a strong obstruction in the ink flowing through the ink supply channel and delays the speed of filtration of the ink, and as a result, delays the ink supply to the ink jet head, i.e., the pressure chamber. In such case, ink discharge failure may occur.

SUMMARY OF THE INVENTION

Accordingly, the present invention provides an ink jet recording apparatus and an ink jet head which reliably suppress the occurrence of ink discharge failure.

The object of the present invention is achieved by the novel ink jet recording apparatus and ink jet head.

According to the novel ink jet recording apparatus. and ink jet head of the present invention, a filter for ink filtration, with a pore size of 2.5 to 5.8 μm, is provided in an ink supply channel to supply ink to the ink jet head. The ink flowing through the ink supply channel is quickly filtered with this filter.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
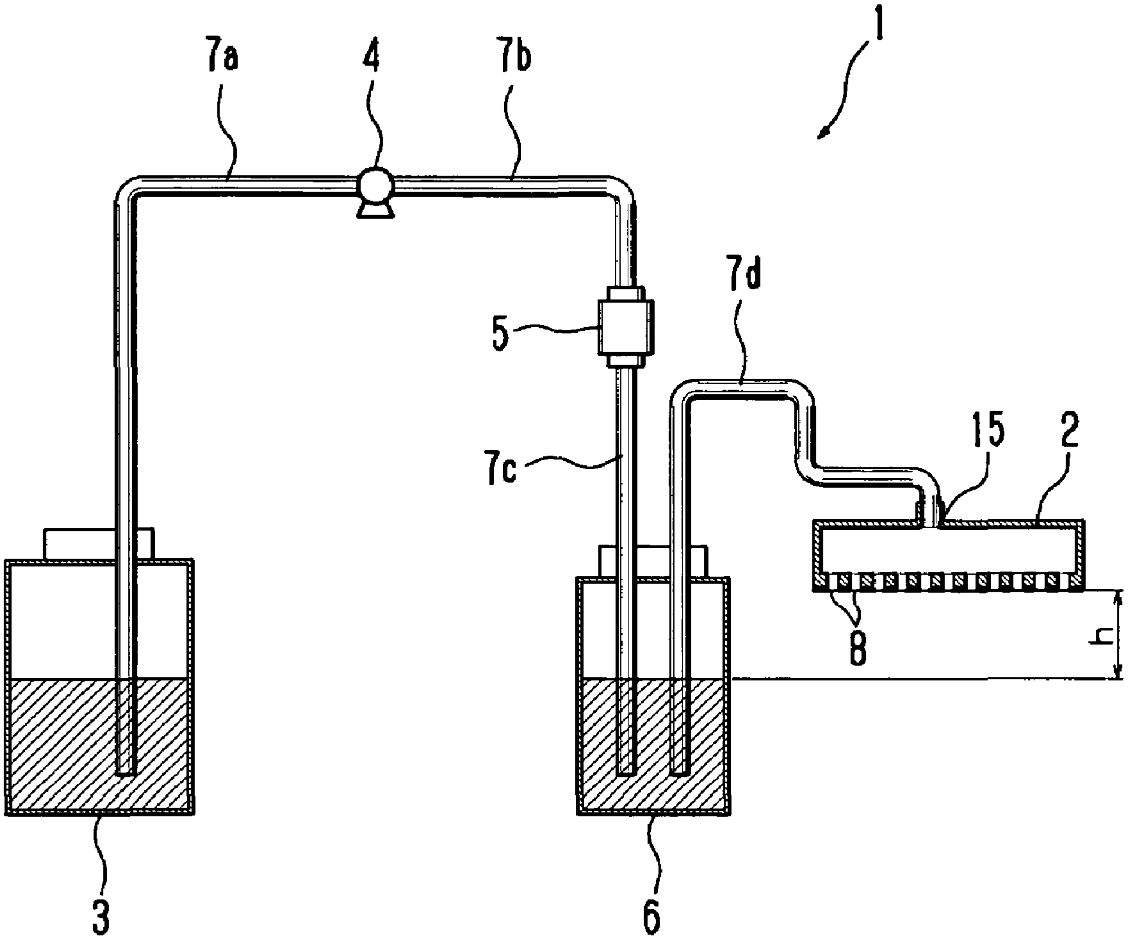
FIG. 1 is a cross sectional view schematically showing an ink supply channel in an ink jet recording apparatus according to an embodiment of the present invention.
Figure 2:
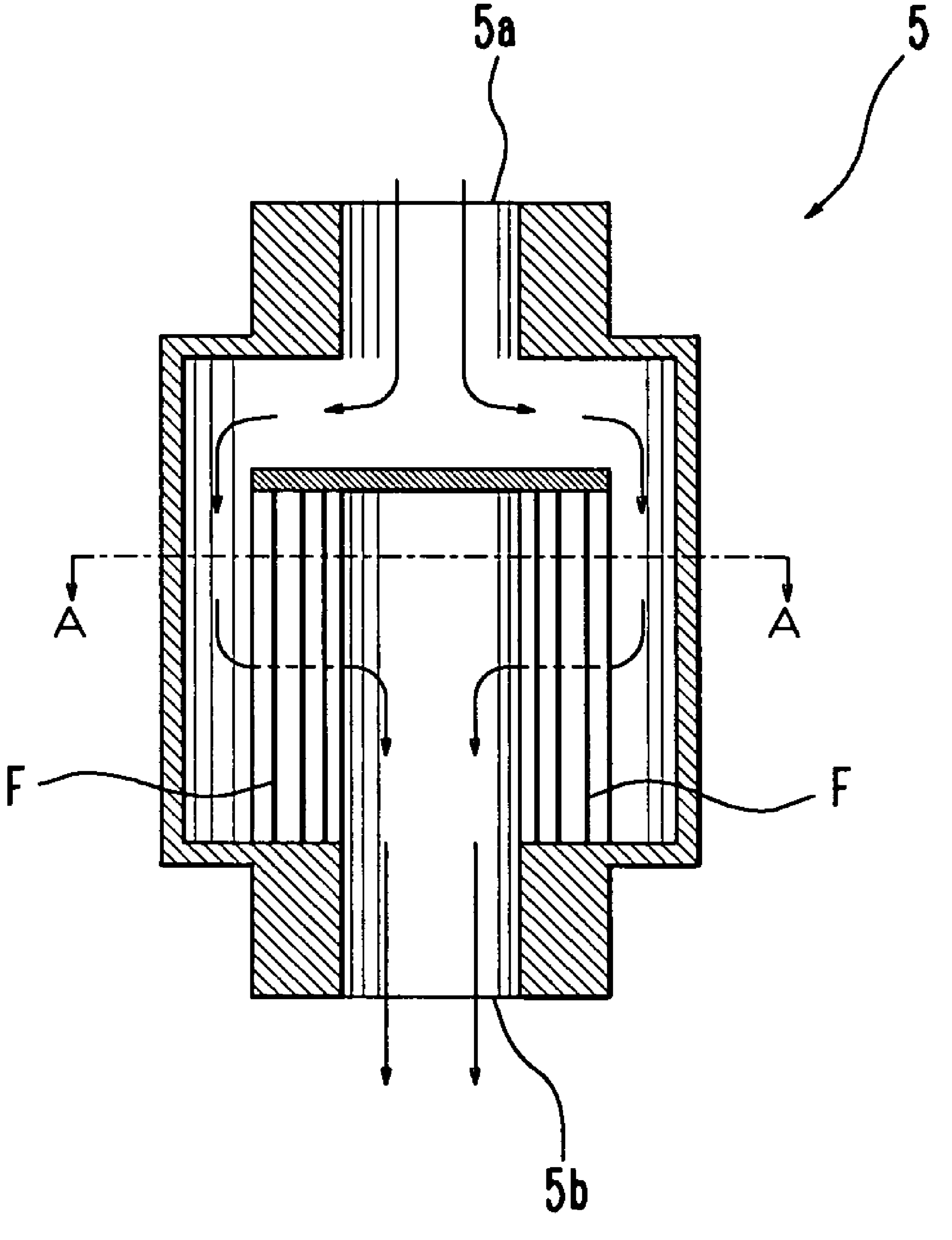
FIG. 2 is a longitudinal sectional view schematically showing the structure of a filter.
Figure 3:
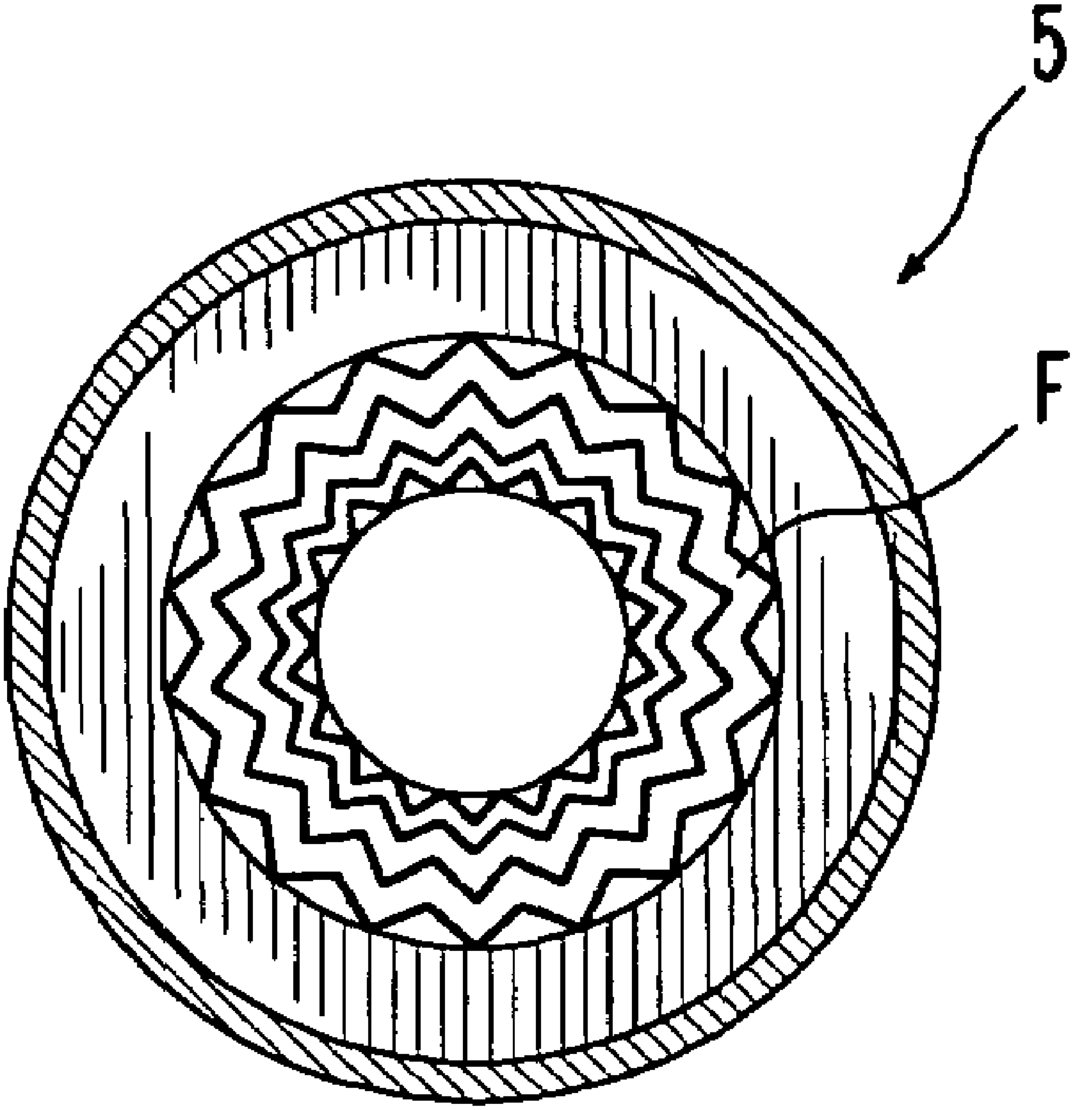
FIG. 3 is a cross-sectional view along a line A-A in FIG. 2.
Figure 4:
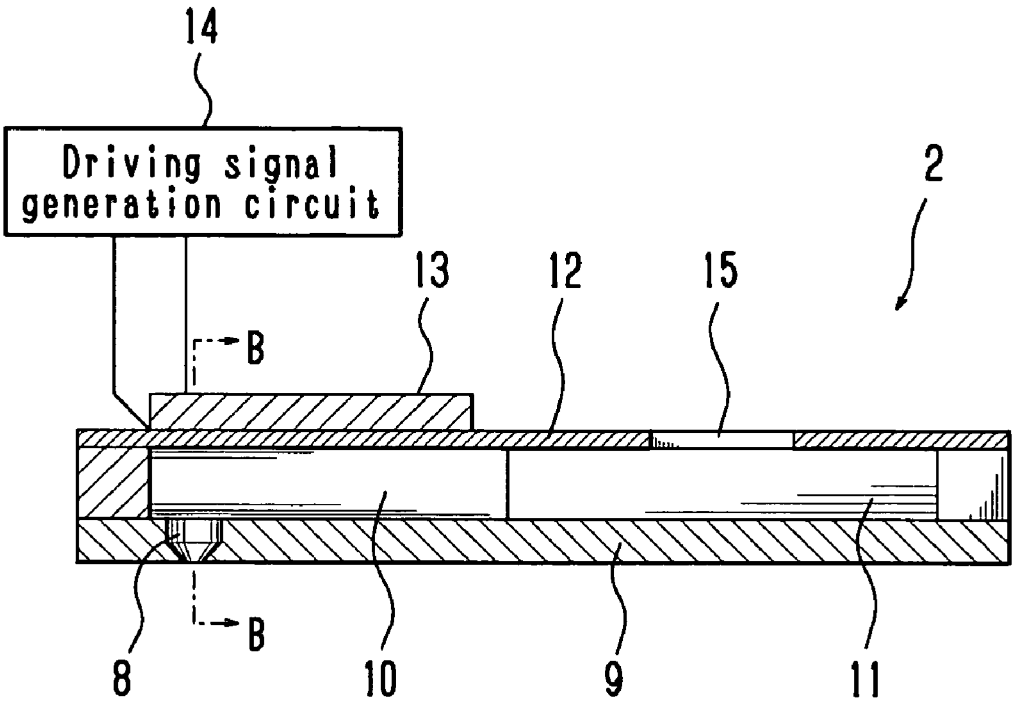
FIG. 4 is a longitudinal sectional view schematically showing an ink jet head.
Figure 5:
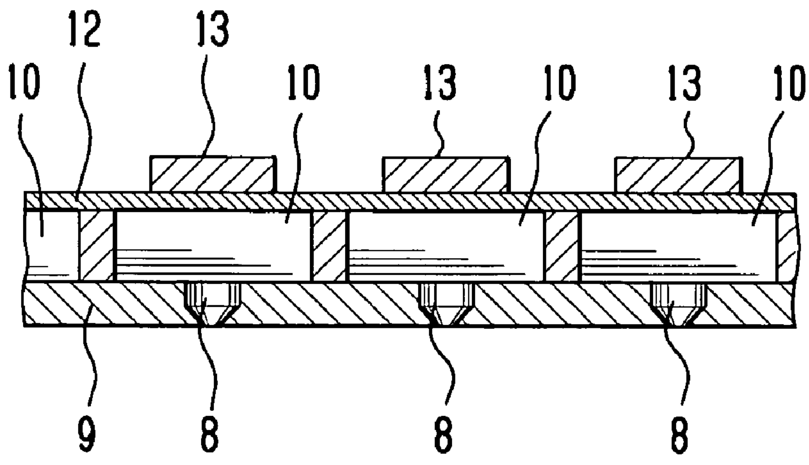
FIG. 5 is a cross-sectional view along a line B-B in FIG. 4.

A preferred embodiment of the present invention will now be described in detail in accordance with the accompanying drawings. FIG. 1 is a cross sectional view schematically showing an ink supply channel in an ink jet recording apparatus according to an embodiment of the present invention. FIG. 2 is a longitudinal sectional view schematically showing the structure of a filter. FIG. 3 is a cross-sectional view along a line A-A in FIG. 2. FIG. 4 is a longitudinal sectional view schematically showing an ink jet head. FIG. 5 is a cross-sectional view along a line B-B in FIG. 4.

As shown in FIG. 1, an ink jet recording apparatus 1 has an ink jet head 2, an ink tank 3, a liquid pump 4, a filter unit 5, an ink reservoir 6 and the like. These elements are interconnected with ink pipes 7*a* to 7*d*. Note that the ink pipes 7*a* to 7*d* function as an ink supply channel to supply ink from the ink tank 3 to the ink jet head 2.

The ink tank 3 is a tank containing ink supplied to the ink jet head 2. That is, the ink tank 3 functions as a ink reservoir containing ink. The ink in the ink tank 3 is supplied by driving of the liquid pump 4, via the filter unit 5 and the ink reservoir 6, to the ink jet head 2. As the ink, oil-based liquid ink is used, and as coloring material, pigment is used.

As shown in FIGS. 2 and 3, the filter unit 5 includes a filter F for ink filtration, and by using this filter F, removes particles in a predetermined size from the ink passing through inside. The filter F has a net form with polypropylene fiber or the like. In the filter F, meshes of the net become smaller toward the center, for gradually filtering ink. Further, the filter unit 5 is provided with an inflow opening 5*a*, which is connected to the ink pipe 7*b* and into which the ink supplied from the liquid pump 4 flows, and an outflow opening 5*b* which is connected to the ink pipe 7*c* and from which the ink passed through the filter F goes out.

Accordingly, the ink flowing from the inflow opening 5*a* is temporarily stored in the filter unit 5, gradually infiltrates toward the inside of the filter F, passes through the filter F and goes out from the outflow opening 5*b*. In this arrangement, in the ink filtered with the filter F, foreign materials which cause clogging in nozzles 8 and small particles as cores of bubbles occurring in the ink jet head 2 are removed.

In the ink reservoir 6, the ink filtered by the filter unit 5 is temporarily stored, and further, negative pressure is applied to the ink in the nozzles 8 by utilizing a water head difference "h" between the surface of ink inside the ink reservoir and the nozzles 8 provided in the ink jet head 2. The operation of the negative pressure prevents leakage of the ink from the nozzles 8. The ink reservoir 6 functions as an ink container containing ink. Note that in a case where the filter unit 5 is provided in the middle of the ink pipe 7*d*, the negative pressure is similarly applied to the ink in the nozzles 8. Further, in this embodiment, the ink reservoir 6 is provided in the ink jet recording apparatus 1, however, the present invention is not limited to this arrangement. For example, the ink reservoir 6 may be omitted.

As shown in FIGS. 4 and 5, the ink jet head 2 has a nozzle plate 9 where the plural nozzles (discharge orifices) 8 are formed, and plural pressure chambers 10 which are provided in positions respectively opposing the nozzles 8 and store the ink. That is, the pressure chambers 10 function as ink containers. The plural pressure chambers 10 are respectively supplied with ink from a common ink chamber 11. A surface forming a part of the pressure chambers 10 and opposing the nozzle plate 9 is formed with a oscillation plate 12. The oscillation plate 12 is provided with plural piezoelectric members 13 corresponding to the respective pressure chambers 10.

The oscillation plate 12 and the piezoelectric members 13 form an actuator. The piezoelectric members 13 are electrically connected to output terminal of a driving signal generation circuit 14. Note that as the piezoelectric member 13, a piezoelectric device (piezo device) is employed, however, the present invention is not limited to the piezoelectric device. The oscillation plate 12, the piezoelectric members 13 and the driving signal generation circuit 14 construct driving means for discharging the ink in the pressure chambers 10 from the nozzles 8 as ink droplets.

The common ink chamber 11 is provided with an ink supply port 15 as an opening connected to the ink pipe 7*d* for ink supply. Further, the plural nozzles 8 are formed in approximately straight line in the nozzle plate 9. The ink jet head 2 is arranged such that the ink is discharged from the nozzles 8 in the nozzle plate 9 as ink droplets.

In the ink jet head 2 having the above construction, a driving signal is applied from the driving signal generation circuit 14 to the piezoelectric members 13, to deform the piezoelectric members 13, thereby the oscillation plate 12 is oscillated. The oscillation changes the capacities of the pressure chambers 10. In the process of increase in the capacity of the pressure chambers 10, the ink in the common ink chamber 11 is sucked by the pressure chambers 10, and in the process of decrease in the capacity of the pressure chambers 10, the ink in the pressure chambers 10 is discharged from the nozzles 8 toward the outside as ink droplets.

Note that in the present embodiment, the piezoelectric member 13 is used as the actuator, however, the present invention is not limited to the piezoelectric member. For example, a heat generator may be used as the actuator. In this case, the ink jet head discharges ink from the nozzles 8 as ink droplets by boiling ink by the heat generator.

Figure 6:
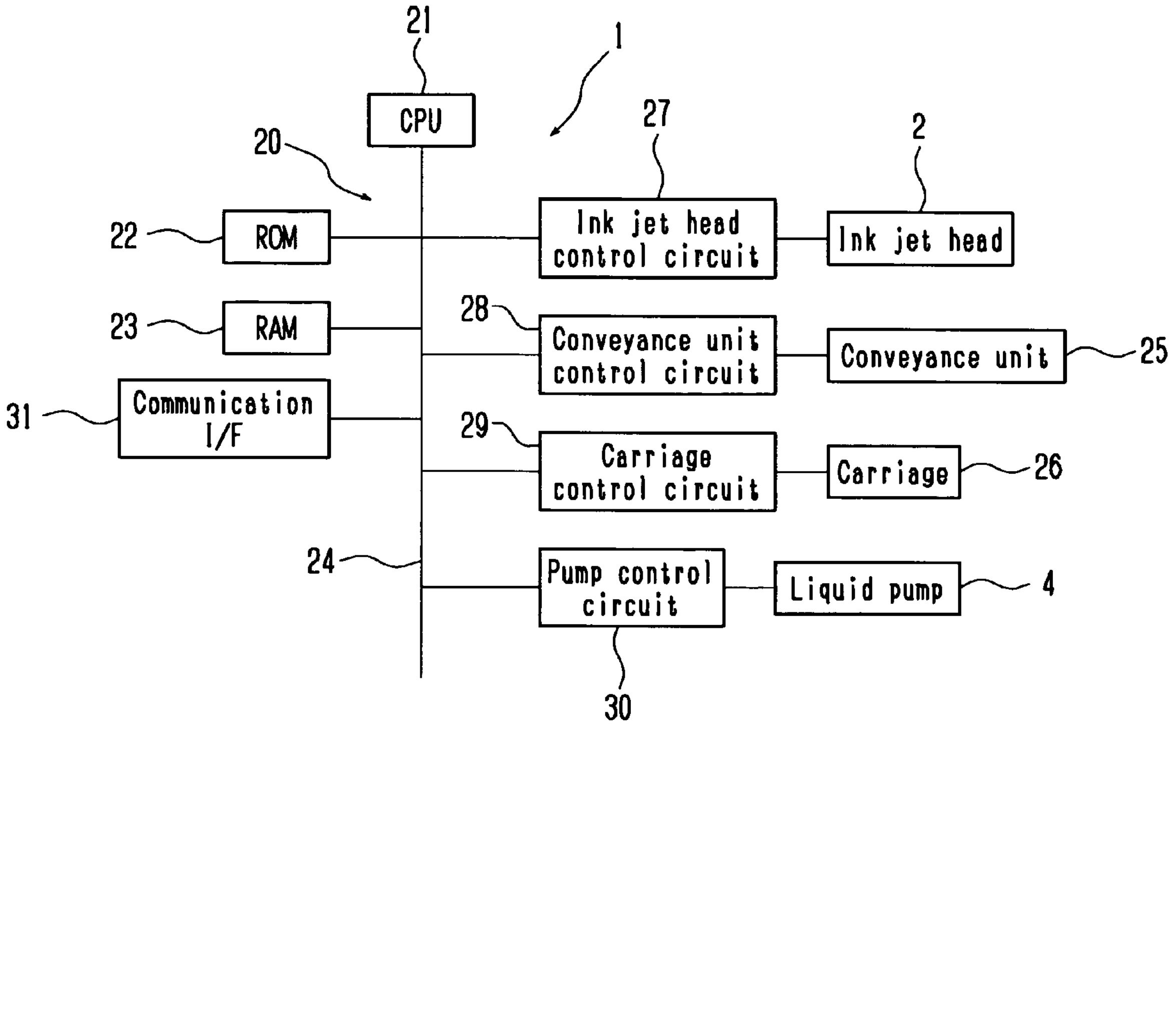
FIG. 6 is a block diagram schematically showing electrical connection among respective elements of the ink jet recording apparatus.

FIG. 6 is a block diagram schematically showing electrical connection among respective elements of the ink jet recording apparatus 1. As shown in FIG. 6, the ink jet recording apparatus 1 has a controller 20. The controller 20 has a CPU (Central Processing Unit) 21 which controls the respective elements in an intensive manner, a ROM (Read Only Memory) 22 in which various programs executed by the CPU 21 and the like are stored, a RAM (Random Access Memory) 23 which functions as a work area for the CPU 21, and the like, interconnected with a bus line 24. Note that the ink jet recording apparatus 1 has a conveyance unit 25 which sequentially feeds recording media such as print sheets and conveys them in a subscanning direction, and a carriage 26 holding the ink jet head 2 and moving in a main scanning direction.

The CPU 21 is connected to the ink jet head 2 via an ink jet head control circuit 27, to the conveyance unit 25 via a conveyance unit control circuit 28, to the carriage 26 via a carriage control circuit 29, and to the liquid pump 4 via a pump control circuit 30. Note that the ink jet head control circuit 27 includes the driving signal generation circuit 14. Further, the CPU 21 is connected to an external device (not shown) such as a personal computer via a communication I/F (interface) 31.

The ink jet recording apparatus 1 having the above construction records (prints) an image on the recording medium, by moving the carriage 26 holding the ink jet head 2 from a home position (stand-by position) in the main scanning direction while conveying the recording medium in the subscanning direction by the conveyance unit 25 and drive-controlling the ink jet head 2, based on image data received from the external device via the communication I/F 31.

As the filter F of the present embodiment, the filter F having the pore size of 2.2 to 5.8 μm is used. That is, as ink is quickly filtered and supplied to the ink jet head 2 without delay by using the filter F with the pore size of 2.2 to 5.8 μm, the occurrence of ink discharge failure can be reliably suppressed. That is, the ink jet head 2 can perform continuous discharging in a stable manner. Further, by using the filter F especially having a pore size of 2.5 to 3.0 μm, the occurrence of ink discharge failure can be more reliably suppressed.

In the present embodiment, the filter F having the pore size of 2.2 to 5.8 μm is used in the ink jet recording apparatus 1. Next, the results of experiments as the ground of the selection of the above filter will be described.

First, 5 types of filter F having pore sizes of 1.5 μm, 2.5 μm, 3.0 μm, 5.0 μm and 8.0 μm were prepared, and the filters F were respectively attached to the above-described ink jet recording apparatus 1 and subjected to a printing experiment. As ink used in the printing experiments, oil-based pigment ink was used. The composition of the oil-based pigment ink is as follows.

| | |
|---|---|
| Pigment | 2 to 7 wt % |
| Solvent | 83 to 92 wt % |
| Dispersant | 5 wt % or less |
| Others (additive agent, surface active agent etc.) | 1 to 5 wt % |

Note that the particle diameter of the pigment as coloring material is average 100 to 400 nm. Further, as the pigment, carbon black, for example, was used.

The printing experiment was made by continuously performing printing by the ink jet recording apparatus 1 for a predetermined period of, e.g., 10 hours, and counting the number of "omission" nozzles 8 by 1 hour. Note that upon execution of continuous printing, control was performed to move the carriage 26 (i.e., the ink jet head 2) from the home position to a predetermined position, and continuously discharge ink from all the nozzles 8 of the ink jet head 2 while conveying the recording medium by the conveyance unit 25. Further, "omission" means a status where ink is not discharged from the nozzle 8 since the nozzle 8 is clogged with ink, and as a result, the ink is not attached to the recording medium. In the present embodiment, the number of nozzles 8 of the ink jet head 2 is, e.g., 318. Considering continuous and large-quantity printing, under the above-described printing condition, it is desirable that the omission ratio is 1.0 or lower. The printing experiments were performed for the purpose of selecting the range of the filter pore size to attain the omission ratio of 1.0 or lower.

Figure 7:
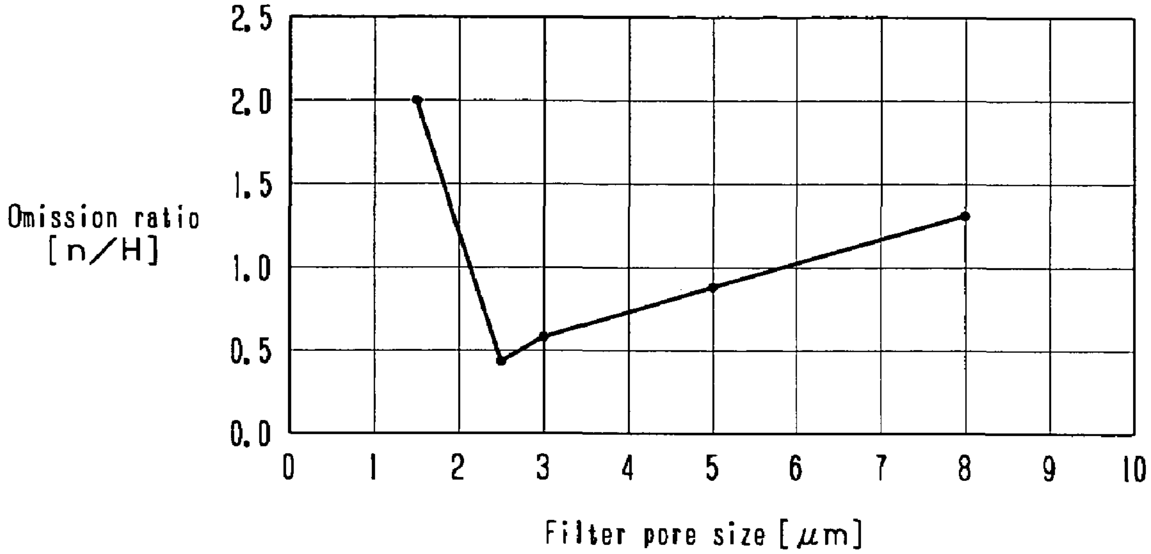
FIG. 7 is a graph showing relation between filter pore size and omission ratio.

FIG. 7 shows the results of the printing experiments. FIG. 7 is a graph showing relation between filter pore size and omission ratio. The omission ratio (n/H) is the number of nozzles 8 (n) where omission occurred per 1 hour (1 H).

As shown in FIG. 7, in a case where the filter with the range of pore size of 2.2 to 5.8 μm is used, the omission ratio is 1.0 or less. It is understood that the occurrence of omission, i.e., the occurrence of ink discharge failure can be reliably suppressed. Further, in a case where the filter with pore size of particularly 2.5 to 3.0 μm is used, the omission ratio is approximately 0.5. It is understood that the occurrence of omission, i.e., the occurrence of ink discharge failure can be more reliably suppressed.

On the other hand, in a case where the filters with the pore sizes of 1.5 μm and 8.0 μm are used, the omission ratio is greater than 1.0. It is understood that the occurrence of omission, i.e., the occurrence of ink discharge failure can not be suppressed. Further, in a case where the filter having the pore size of 1.5 μm is used, since the pore size is the smallest, the removal of particles in ink must be improved. However, the omission ratio is 2.0, and it is understood that the occurrence of omission, i.e., the occurrence of ink discharge failure can not be reliably suppressed.

Accordingly, the filter F with the pore size of 2.2 to 5.8 μm is used in the ink jet recording apparatus 1, thereby ink can be quickly filtered and supplied to the ink jet head 2 without delay. Further, as the ink is filtered with the filter F, foreign materials which cause clogging in the nozzles 8 and small particles which become cores of bubbles can be excellently removed. Even in use of oil-based pigment ink, the occurrence of ink discharge failure can be reliably suppressed. Further, by using the filter F with the pore size of 2.5 to 3.0 μm, the occurrence of ink discharge failure can be more reliably suppressed.

Note that in the present embodiment, as the ink is oil-based pigment ink, i.e., the ink tank 3 as the ink container contains oil-based pigment ink, the suppression of the occurrence of ink discharge failure can be further improved. Further, blur or color-fade out of ink attached to a recording medium such as a print sheet can be suppressed in comparison with dye ink or the like. Further, the pigment of the oil-based pigment ink is carbon black and the particle diameter of the pigment of the oil-based pigment ink is average 100 to 400 mn, the suppression of the occurrence of ink discharge failure can be further improved.

Further, the ink in the pressure chambers 10 was filtered with the filter F having the pore size of 2.2 to 5.8 μm. That is, foreign materials and small particles are removed from the ink, and the ink can be quickly supplied to the pressure chambers 10. Thus the occurrence of ink discharge failure can be reliably suppressed. Further, the occurrence of ink discharge failure can be more reliably suppressed by using the filter F with the pore size of 2.5 to 3.0 μm.

Obviously, numerous modifications and variations of the present invention are possible in light of the above teachings. It is therefore to be understood that within the scope of appended claims, the invention may be practiced otherwise than as specifically described herein.

What is claimed is:

1. An ink jet recording apparatus, comprising:

an ink container that contains oil-based pigment ink;

an ink jet head which includes an ink chamber to contain the ink and a plurality of nozzles as discharge orifices communicating with the ink chamber, and which applies pressure to the ink in the ink chamber for discharging the ink as ink droplets from the nozzles;

an ink supply channel which is provided between the ink container and the ink chamber, and which supplies the ink from the ink container to the ink chamber; and a cylindrical filter that is provided in the ink supply channel such that the ink from the ink container enters the cylindrical filter through an outer side of the cylindrical filter, passes inward through the cylindrical filter to be filtered, and exits the cylindrical filter through an open inner portion of the cylindrical filter to be supplied to the ink chamber;

wherein the filter has a pore size of 2.2 to 5.8 μm, and an average particle diameter of a pigment of the oil-based pigment ink is 100 to 400 nm, so as to achieve an omission ratio less than or equal to 1.0, where the omission ratio is defined as the number of nozzles (n) at which failure to discharge occurs per 1 hour.

2. The ink jet recording apparatus according to claim 1, wherein the pigment of the oil-based pigment ink is carbon black.

3. An ink jet head, comprising:

an ink chamber containing oil-based pigment ink;

a plurality of nozzles as discharge orifices communicating with the ink chamber; and driving means for applying pressure to the ink in the ink chamber to discharge the ink in the ink chamber as ink droplets from the nozzles;

wherein the ink is filtered with a cylindrical filter such that unfiltered ink enters the cylindrical filter through an outer side of the cylindrical filter, passes inward through the cylindrical filter to be filtered, and exits the cylindrical filter through an open inner portion of the cylindrical filter; and wherein the filter has a pore size of 2.2 to 5.8 μm, and an average particle diameter of a pigment of the oilbased pigment ink is 100 to 400 nm, so as to achieve an omission ratio less than or equal to 1.0, where the omission ratio is defined as the number of nozzles (n) at which failure to discharge occurs per 1 hour.

4. The ink jet head according to claim 3, wherein the pigment of the oilbased pigment ink is carbon black.

5. The ink jet recording apparatus according to claim 1, wherein the pore size of the filter is 2.5 to 3.0 μm.

6. The ink jet recording apparatus according to claim 2, wherein the pore size of the filter is 2.5 to 3.0 μm.

7. The ink jet head according to claim 3, wherein the pore size of the filter is 2.5 to 3.0 μm.

8. The ink jet head according to claim 4, wherein the pore size of the filter is 2.5 to 3.0 μm.

* * * * *